United States Patent [19]
Warner

[11] Patent Number: 5,716,106
[45] Date of Patent: Feb. 10, 1998

[54] TRACTION ENHANCING DEVICE

[75] Inventor: Joseph G. Warner, Sterling Heights, Mich.

[73] Assignee: The United States of America as represented by the Secretary of the Army, Washington, D.C.

[21] Appl. No.: 692,889

[22] Filed: Jul. 15, 1996

[51] Int. Cl.$^6$ ............................................. B60B 15/26
[52] U.S. Cl. ................................. 301/40.1; 301/41.1
[58] Field of Search ........................ 301/13.2, 36.1, 301/38.1, 39.1, 40.1, 40.2, 40.3, 41.1, 43

[56] References Cited

U.S. PATENT DOCUMENTS

| | | | |
|---|---|---|---|
| 1,568,937 | 1/1926 | Zwalsh | 301/40.1 |
| 1,572,806 | 2/1926 | Peterson et al. | 301/40.2 |
| 2,191,392 | 2/1940 | Huarte | 301/40.1 |
| 2,516,896 | 8/1950 | Manning | 301/36.1 |
| 5,046,785 | 9/1991 | Bockerman | 301/52 |
| 5,078,326 | 1/1992 | Wright | 301/43 X |

FOREIGN PATENT DOCUMENTS

| | | | |
|---|---|---|---|
| 196725 | 3/1958 | Austria | 301/41.1 |
| 1190271 | 10/1959 | France | 301/38.1 |

Primary Examiner—Russell D. Stormer
Attorney, Agent, or Firm—Peter A. Taucher; Gail S. Soderling

[57] ABSTRACT

An auxiliary traction device for use with a wheeled vehicle to be attached to the vehicle wheels for additional traction during traverse of soft terrain. The traction device includes a spider adapted for attachment to the wheel hubs of the vehicle with a frusto-conical shaped web extending away from the wheel. An annular spool traction member having a diameter less than the diameter of the tire is mounted on the frusto-conical shaped web to provide additional traction for the vehicle in soft terrains.

2 Claims, 2 Drawing Sheets

TRACTION ENHANCING DEVICE

GOVERNMENT INTEREST

The invention described herein may be made, used and licensed by or for the U.S. Government for governmental purposes without paying me royalties.

BACKGROUND

Military vehicles operate under the widest and most diverse terrains of any vehicles. Because of the requirement to go visually eveywhere, many combat vehicles such as tanks and self propelled howitzers are manufactured as tracked vehicles. Tracked vehicles have a low pressure foot print and are able to traverse a wide variety of different terrains. The military also has a need for a wide variety of vehicles and the majority of the military fleet is composed of vehicles such as trucks and the like with a normal wheeled configuration. This creates a mobility disparity in the military fleet in that the wheeled vehicles are frequently not able to traverse soft terrain such as sand or soft earth as well as tracked vehicles. Since the wheeled vehicles provide a wide range of support services and also represent an integral part of the fleet, their inability to go with tracked vehicles is an operational deficiency.

It has been proposed and there are systems in existence which place a band of flexible material around tire sets to form a track which can be driven by the tires. This provides a solution primarily for vehicles which have dual drive wheels and is less useful for the normal four wheeled vehicles which are required to service the fleet. However, the wheeled vehicles can not operate on the highway without removing the band. Because the band must be installed and removed for use on various conditions this solution requires additional work and time to implement as the vehicle shifts terrains. Obviously it would be better to have a device which is easily installed and goes from the road to field to road without stopping the vehicle for change over.

The banded tire solutions are also time consuming to install, remove and require tensioning devices and specialized tools. It would be desirable to have any traction enhancing device configured for easy and quick installation on a wheeled vehicle using tools commonly available to the fleet operators and which need not be removed when the vehicle is again to be used on an improved or hardened surface.

It would be desirable to have a traction enhancing means to allow wheeled vehicles to traverse soft soil conditions to service and support the tracked fleet. In addition, the traction enhancing means should allow the wheeled vehicle to operate on the highway in the normal wheeled mode and with out significant loss of fuel economy.

BACKGROUND OF THE INVENTION

The present invention provides a device which can be easily installed and uninstalled using simple tools and in a minimum amount of time. The device will provide enhanced traction on soft terrains yet allow the vehicle to operate on a hardened surface without requiring removal. Briefly, the present invention provides an auxiliary traction enhancing device for use with a wheeled vehicle during traverse of soft terrain. The traction enhancing device includes a spider which can be attached to the wheel hub of the wheeled vehicle using the lug nuts already provided for attachment of the wheels bearing the tires. The spider has a disk juxtaposed the inner portion of the tire's rim, the disk having a plurality of apertures corresponding to the lug nut configuration of the axle to which the tire rim is attached. A frusto-conical shaped web extends away from the disk, the support web flaring outward from the planer surface. The frusto-conical web ends at a position outside the wheel rim. The frusto-conical support web has an L-shaped cross section circular mounting bracket attached to the outer edge. The L-shaped bracket is attached to the end of the frusto-conical web opposite the disk with one leg of the L-shaped bracket attached to the frusto-conical web so that the leg is coaxial with the axis of the axle to which the wheel is attached. The second leg of the L-shaped bracket extends away from the first leg outward from the center of the spider the second leg being disposed in a plane parallel to the plane of the wheel rim.

An annular spool traction member is attached to the second and of the L-shaped bracket. The spool traction member has a reduced diameter less than the diameter of the tire to which the traction device is attached. The spool member has inner and outer flanges one flange being located on each end of the spool, the flanges being connected by an annular center portion. The center portion has a diameter less than the diameter of the flanges.

BRIEF DESCRIPTION OF THE DRAWING

In the accompanying drawing.

DETAILED DESCRIPTION

Figure 1:
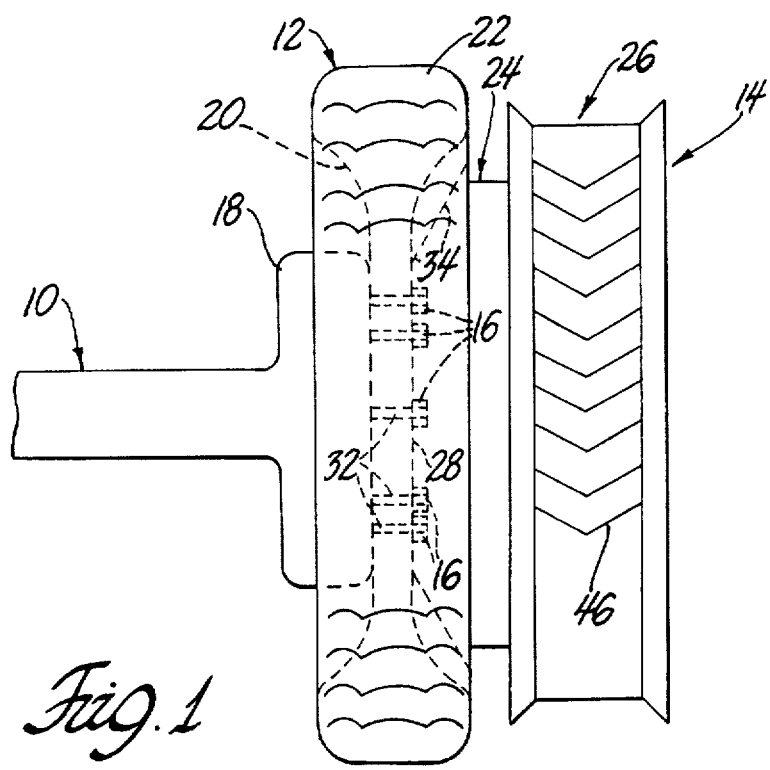
FIG. 1 is a front view of one embodiment of this invention attached to a wheel.

Referring to the drawing in which like numerals refer to like parts and initially to FIG. 1, a partial vehicle axle 10 is shown with a tire 12 and a traction enhancing device 14 attached to the axle using lug nuts 16. The structure of axle 10 will not be described in great detail as the structure of vehicle drive axles and the choice of drive axle components for a given usage is known in the art. Drive axles are attached to and provide the power necessary to support and move the vehicle body and any load. Conventionally, the axle 10 has an enlarged section 18 on which a wheel rim 20 is mounted. The wheel rim 20 is designed to hold a tire 22 in a conventional manner. The axle, 10 wheel rim 20, tire 22 mounting system is conventional in the art and further discussion is omitted in the interest of brevity.

Figure 2:
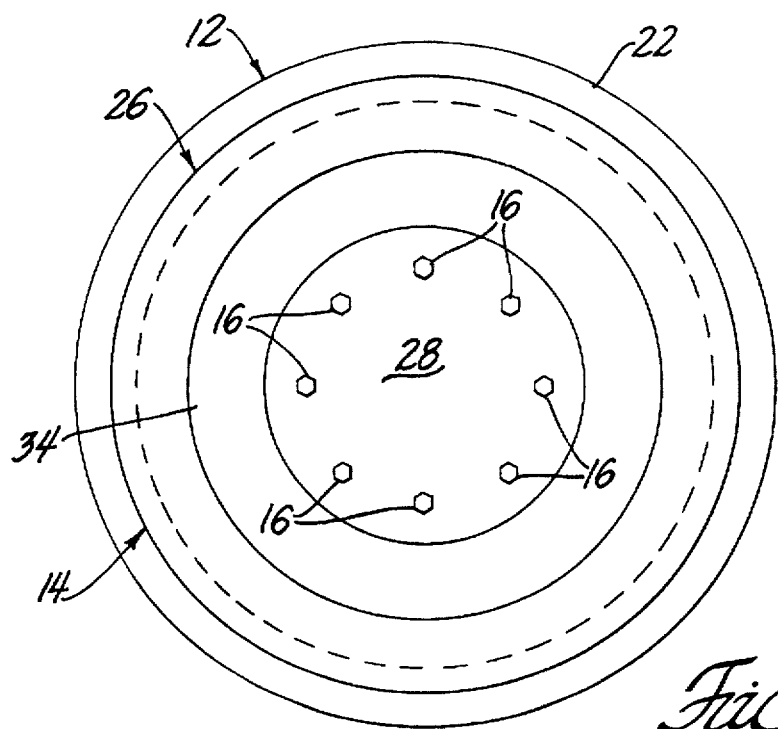
FIG. 2 is a side view of FIG. 1.
Figure 3:
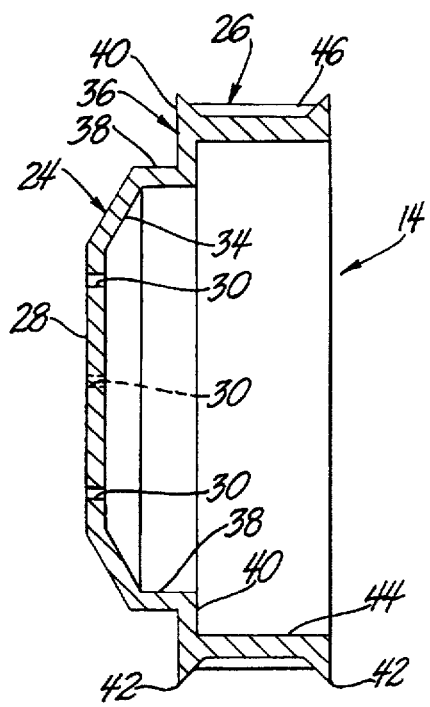
FIG. 3 is a cross sectional view of the traction enhancing device of FIG. 1.

The present invention resides in the structure of the traction enhancing device 14. The device 14 can be thought of as comprising two sections a spider 24 and a traction spool member 26. The spider 24 has a disk 28 containing a plurality of apertures 30 formed therein the apertures corresponding in location to the lug nut 16 configuration of the axle 10. As shown in FIG. 2, all the lug nuts are being used to mount and attach the spider 24 to the axle 10. However, where the traction device 14 is to be used sparingly and under light load conditions, only a portion of the lug nuts 16 need be used and enlarged apertures which would fit over any unutilized lug nuts without interference could be formed in the disk 28 for a portion of the lug nut apertures. When the traction enhancing device 14 is installed as shown in FIG. 1, the disk 28 will be juxtaposed the wheel rim 20 with the threaded studs 32 on the axle 10 passing through the apertures 30 in the disk. The lug nuts 16 are then tightened thereby firmly mounting the disk to the axle 10.

A frusto-conical shaped web 34 extends outward and away from the disk 28. The smaller diameter portion of the frusto-conical web 34 is attached to the disk 28 so web 34 flares outward from the disk 28 to a position near the outside of the wheel rim 20. The frusto-conical support web 34 serves as an intermediate portion of the spider 24.

The frusto-conical support web 34 has an L-shaped cross section circular mounting bracket 36 firmly mounted at the larger diameter end of the frusto-conical support web 34. The L-shaped bracket has a first leg 38 attached to the frusto-conical support web 34, the first leg being oriented so the annular ring formed by the first leg 36 has its axis coaxial with the axis of the axle 10 with the edge of the ring being located outside the wheel 20. The second leg 40 is attached to the edge of the ring outside the wheel and extends perpendicular to the first leg 38 the leg lying essentially in a plane parallel to and separated from the plane defined by disk 28. The outer diameter of the ring formed by the second leg 40 will be slightly smaller than the normal outer diameter of the tire in its inflated condition when pressurized for over the road use. In choosing the diameter to be used, it should be taken into account that military vehicles are frequently equipped with central tire inflation systems which allow the tire to be inflated and deflated from passenger compartment. The present invention provides a system which can be sized to allow the tires to be deflated slightly for traversing soft terrain and reinflated for speed and fuel economy when the vehicle is to operated on improved or hardened surfaces without injuring the traction device 14.

The annular spool traction member 26 is attached to the second leg 40 of the L-shaped bracket at the end distal the attachment to the first leg 38. The spool member 26 has a diameter about the same as the outer edge of the L-shaped bracket 36 and generally less than the diameter of the tire 12 to which the traction enhancer is attached when the tire is pressurized to its over the road diameter. The spool member 26 as shown has a flange 42 located on each end of the spool. An annular center portion 44 connects the flanges and presents a increased surface area over which to spread the vehicle's weight when the center portion comes into contact with the terrain. As shown, the annular center portion 44 has a plurality of chevron shaped, raised ribs 46 to provide raised cutting edges for additional traction.

Figure 4:
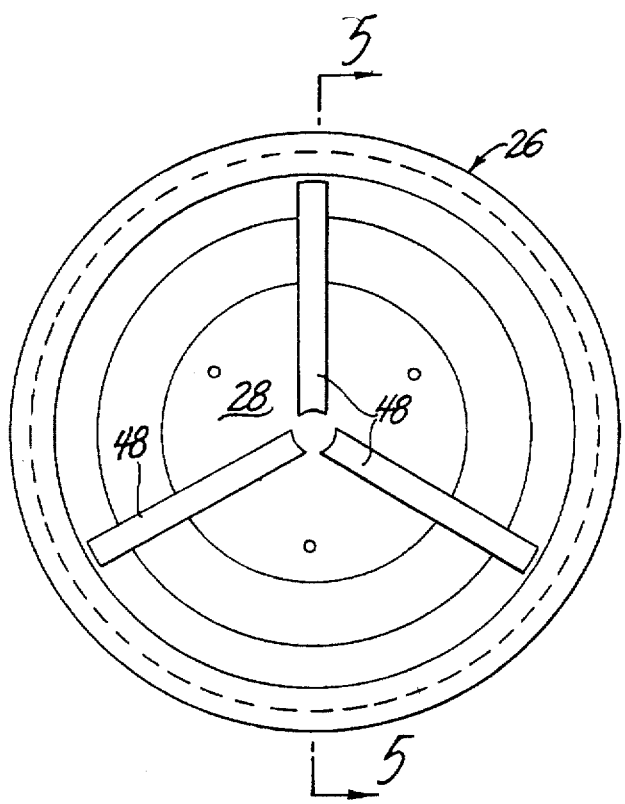
FIG. 4 is a side view of a second embodiment of a traction enhancing device with additional support structure.
Figure 5:
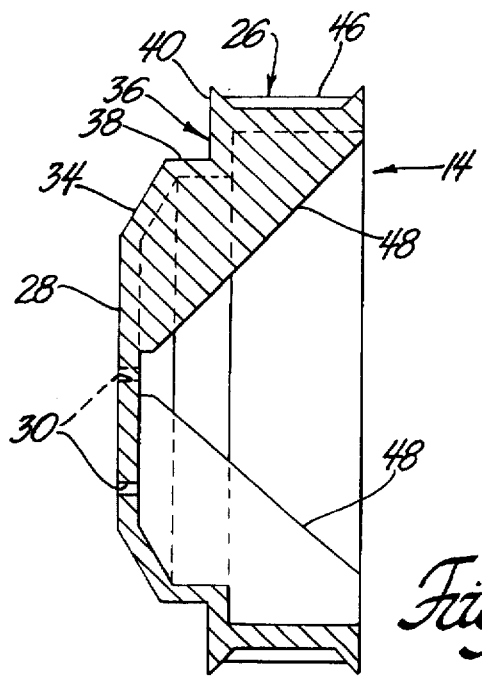
FIG. 5 is cross sectional view of the embodiment of FIG. 4.

A second embodiment of the present invention is shown in FIGS. 4 and 5. In this embodiment a plurality of radially extending ribs or buttresses 48 are disposed between the disk 28 and the spool traction member 26. The buttresses 48 as shown are solid substantially triangular members, three in number, which have one edge attached to the disk 28 and another edge attached to the inner diameter of the spool member 26. This configuration will help maintain the spool 26 in its annular shape when there is a load applied due to the vehicle traversing soft terrain. The buttresses 48 add little weight to the over all configuration and provide a substantial amount of stiffening.

What is claimed is:

1. An auxiliary traction enhancing device for use with a wheeled vehicle having a plurality of axles, the axles having wheel hubs located on each end of the axle, the wheel hubs having associated studs extending therefrom, the studs being suitable for the attachment of a wheel having a tire mounted thereon, the wheels mounted on the hubs serving to support and drive the vehicle, the traction device being mounted to the vehicle axle for additional traction during traverse of soft terrain including:

a spider adapted for attachment to the wheel hub of the wheeled vehicle to which the traction enhancing device is attached, the spider having a disk juxtaposed the inner portion of the wheel rim, the disk having a plurality of apertures corresponding to the lug nut configuration of the axle to which the disk to is be attached, a frusto-conical shaped web extending away from the disk surface and the wheel rim, the frusto-conical web flaring outward from the planer surface to a position outside the wheel, an L-shaped cross section circular mounting bracket, the L-shaped bracket being attached to the end of the frusto-conical web opposite the disk one leg of the L-shaped bracket being attached to the frusto-conical web so that the leg extends coaxially with respect to the axis of the axle to which the wheel is attached; and an annular spool traction member having a diameter less than the diameter of the tire mounted on the wheel to which the traction enhancer is attached, the annular spool member having a flange located on the inner and outer sides of the spool, the flanges being connected by a center portion, the center portion having a diameter less than the diameter of the flanges so the flanges provide raised cutting edges and the center portion provides additional surface area for the traction enhancer.

2. The traction enhancer of claim 1 where the spider has a plurality of buttresses associated therewith said buttresses having one edge attached to said disk and an adjacent side being attached to the inner surface of the annular spool member.

* * * * *